A. B. RIDER.
Improvement in Device for Preventing Backlash in Mills.
No. 128,327.  Patented June 25, 1872.
Fig. 2.
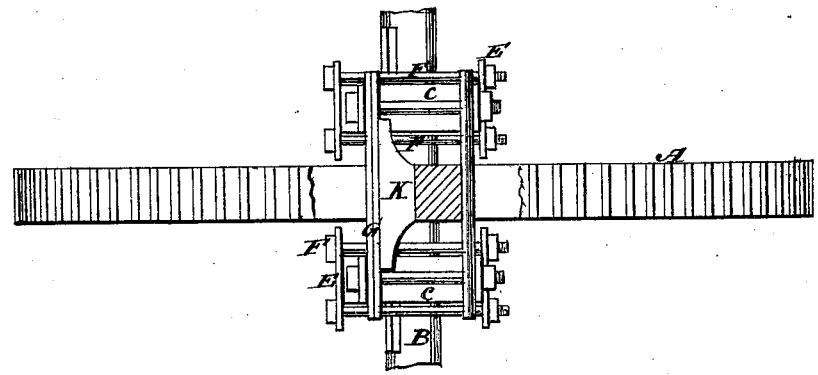
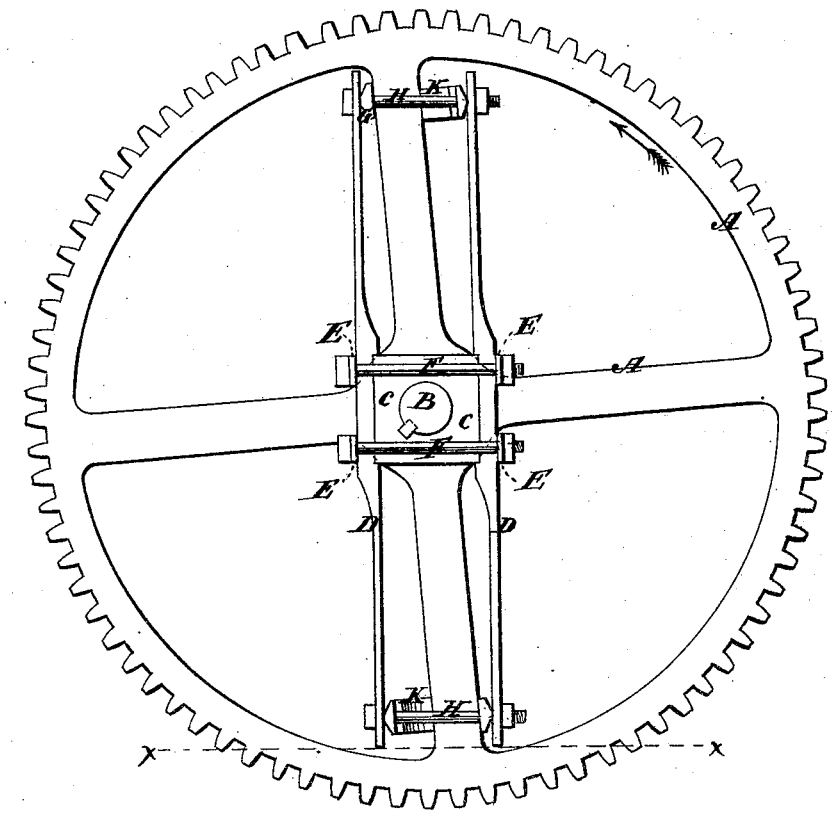
Witnesses:
E. Wolff.
W. A. Graham
Inventor:
A. B. Rider
per Munn & Co
Attorneys.

UNITED STATES PATENT OFFICE.

ALEXIS B. RIDER, OF FAIRFIELD, ILLINOIS.

IMPROVEMENT IN DEVICES FOR PREVENTING BACKLASH IN MILLS.

Specification forming part of Letters Patent No. 128,327, dated June 25, 1872.

Specification describing a new and useful Improvement in Mill-Gearing, invented by ALEXIS B. RIDER, of Fairfield, in the county of Wayne and State of Illinois.

My invention consists in connecting the spur-wheels of flouring-mills and other machinery, wherever it may be required, to the shaft by wooden springs in such manner that said springs will take up the "backlash," and thereby avoid the irregularity due to the positive connection of such wheels.

Figure 1 is a plan view of a spur-wheel and my improved arrangement for connecting it to the shaft by springs, and Fig. 2 is a side elevation sectioned on the line $x$ $x$ of Fig. 1.

Similar letters of reference indicate corresponding parts.

A is the wheel, and B the shaft. C represents two square blocks of metal keyed fast to the shaft, one above and the other below the wheel, which is fixed loosely on said shaft. D represents strong wooden springs, nearly as long as the diameter of the wheel clamped to said blocks, two to each, on opposite sides by bolts F and plates E. At the outer ends these springs bear against the ends of other springs G passing through the wheel on each side of one of the arms, and held in position by the bolts H passing through them and the springs D. A block, K, is placed between the rear spring G and the rear side of the arm to stiffen the said rear spring, by which the propelling force is applied to the wheel. These springs will be made sufficiently strong to transmit the power safely; but they will be graduated to yield thereby, so that in case the driven mechanism overruns, or the driver falls short, the "backlash," common to such gearing when the wheel is keyed fast will be taken up by them. These wood springs are much better for this particular use than metal springs; because, not being required to yield so much as to demand the greater elasticity of metal, the greater resistance of the wood against breaking force is made available.

Having thus described my invention, I claim as new and desire to secure by Letters Patent—

The combination of the wood springs D G, with the wheel A fixed loosely on the shaft, and the blocks C keyed to said shaft, all substantially as specified.

ALEXIS B. RIDER.

Witnesses:
    C. C. BOGGS,
    C. CHALL.